May 29, 1956  G. A. JORGENSON  2,747,753
BREAD DEPANNER
Filed March 1, 1951  7 Sheets-Sheet 1

INVENTOR.
GERALD A. JORGENSON
BY
Otto Moeller
Attorney

May 29, 1956  G. A. JORGENSON  2,747,753
BREAD DEPANNER
Filed March 1, 1951  7 Sheets-Sheet 2

INVENTOR.
GERALD A. JORGENSON
BY
Otto Moeller
Attorney

May 29, 1956     G. A. JORGENSON     2,747,753
BREAD DEPANNER
Filed March 1, 1951     7 Sheets-Sheet 3
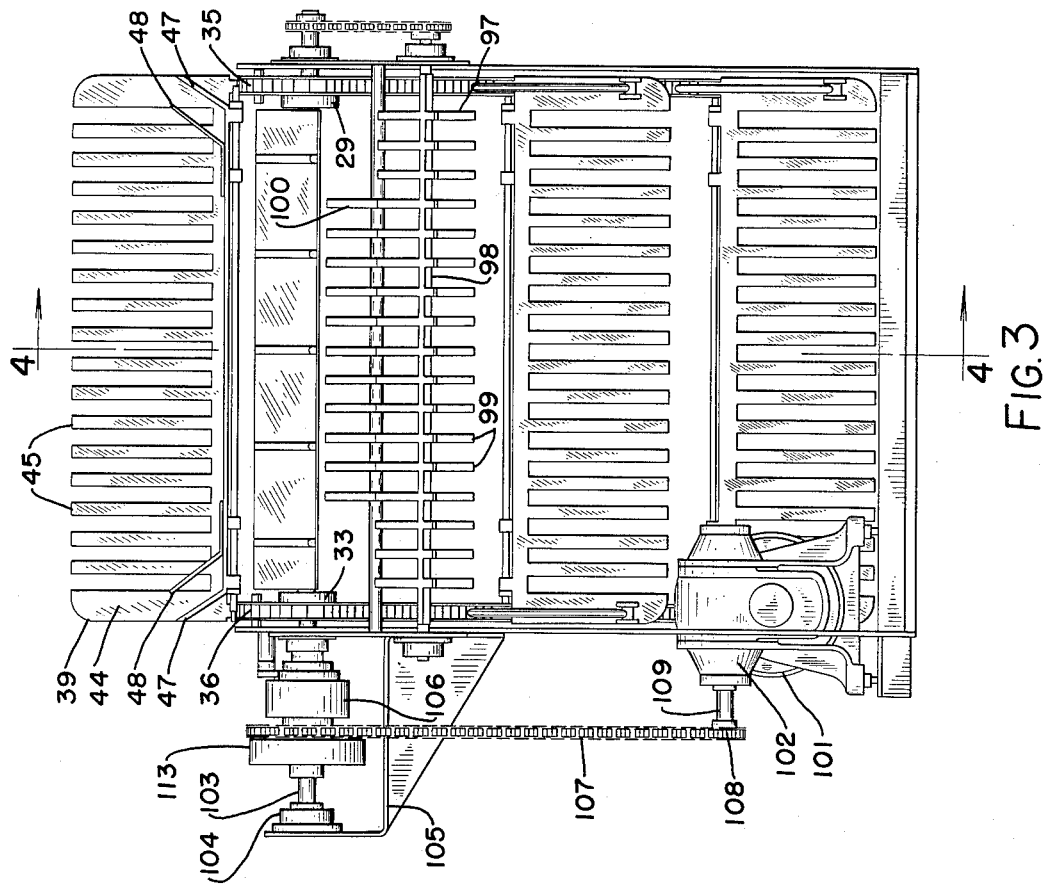
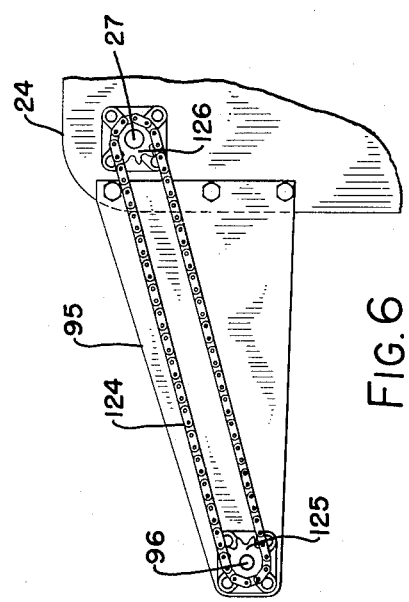
INVENTOR.
GERALD A. JORGENSON
BY
*Otto Moeller*
Attorney

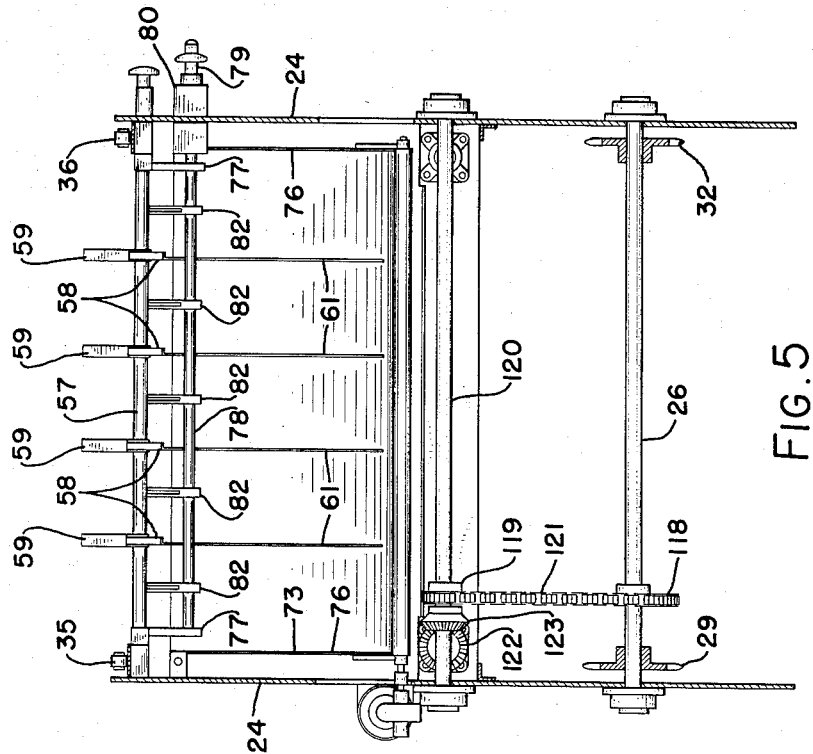
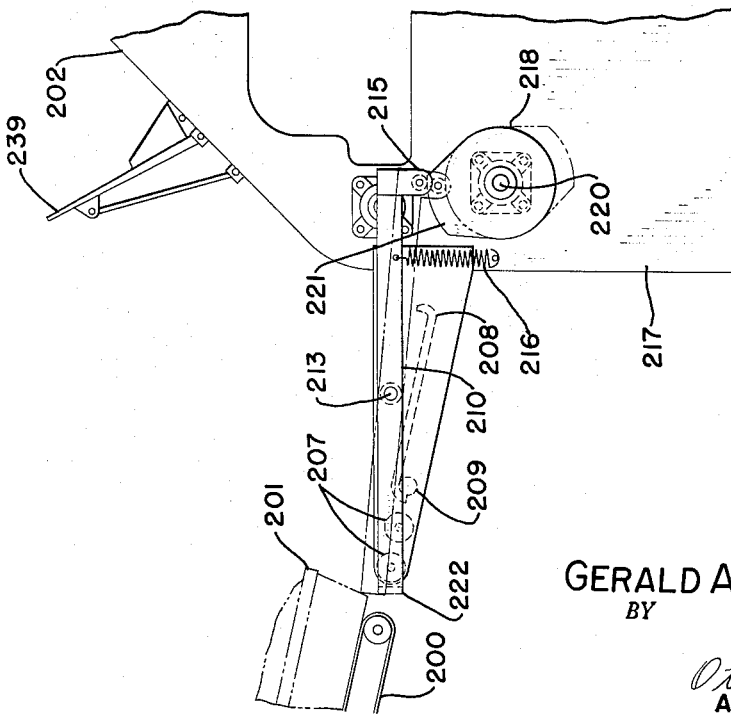
*INVENTOR.*
GERALD A. JORGENSON
BY
Otto Moeller
Attorney

May 29, 1956  G. A. JORGENSON  2,747,753
BREAD DEPANNER

Filed March 1, 1951  7 Sheets-Sheet 6

INVENTOR.
GERALD A. JORGENSON
BY
*Otto Moeller*
Attorney

May 29, 1956  G. A. JORGENSON  2,747,753
BREAD DEPANNER

Filed March 1, 1951  7 Sheets-Sheet 7

INVENTOR.
GERALD A. JORGENSON
BY
Otto Woeller
Attorney

United States Patent Office 2,747,753
Patented May 29, 1956

2,747,753

BREAD DEPANNER

Gerald A. Jorgenson, York, Pa., assignor to Read Standard Corporation, a corporation of Delaware Application March 1, 1951, Serial No. 213,357

7 Claims. (Cl. 214—308)

This invention relates generally to bakery equipment and particularly to a device for removing bread from the pans in which they have been baked.

It is an object of the invention to provide an improved device for automatically removing bread from straps of pans of various sizes and shapes in a rapid and efficient manner and which device is extremely compact, requiring a minimum of floor space and that is sufficiently low for convenient access in cleaning and making adjustments or repairs.

Another object of the invention is to provide a bread depanner of the type described in which substantially instantaneous and complete removal of the loaves from the pans is assured. Some loaves will adhere to the pans to a greater degree than others, so that if upon inverting the pans to remove the loaves, some remain in the pans, the operator's time is taken in manually removing these loaves, or if the loaves are only partly removed or not removed with sufficient rapidity then as the pans are moved along, such loaves will be crippled or will jam the machine. Such difficulties are rendered negligible in the present machine.

Another feature of the invention consists in the novel means employed to right and dispose of the pans following inverting and removal of the bread therefrom.

Another feature of the invention consists in the novel means for feeding filled pans one at a time to the loading station pan support of the depanner synchronized with the operation of the carriers that transport the pans to the bread dumping station so that succeeding pans are positively held back until a preceeding pan has been lifted from the loading station pan support by a pan carrier.

With the foregoing and other objects in view as will appear from the following description, the invention further consists in the combination and arrangement of parts and in the details of construction, it being understood that changes may be made in the particular embodiments of the invention without departing from the spirit thereof.

In the drawings accompanying the following description:

Figure 3 is an end elevation of the pan righting end of the depanner;

Figure 5 is a sectional view taken on the line 5—5 of Figure 4.

Figure 6 is a fragmentary view in side elevation of the depanner showing the drive for the pan righting mechanism;

Figure 8 is a view in side elevation at the infeed end of the depanner, showing a modification of the pan receiving and supporting mechanism;

Figure 1:
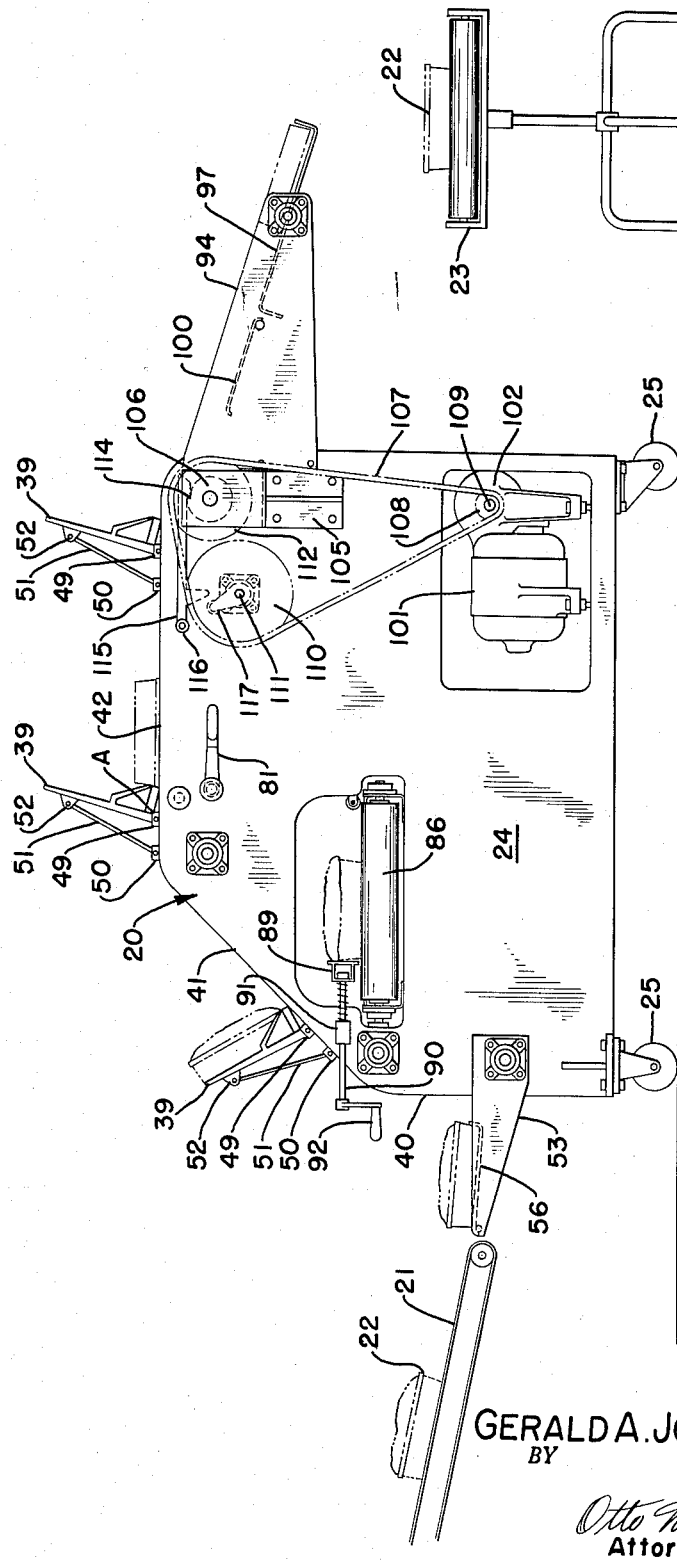
Figure 1 is a view in side elevation of the depanner with a conveyor for delivering the pans of bread thereto at one end and a conveyor for removing the righted empty pans at the opposite end.

Referring to the drawings, the depanner is designated as a whole by the numeral 20. At 21 is a conveyor for delivering straps of pans 22 of baked bread from an oven (not shown) to the depanner 20, and at the opposite end of the depanner is a conveyor 23 arranged to receive the pans 22 in righted position and from which the loaves of bread have been removed.

The depanner 20 embodies a framework 24 that may be built up of angle iron and metal plates, and is preferably mounted on casters 25 to make the unit portable.

Figure 4:
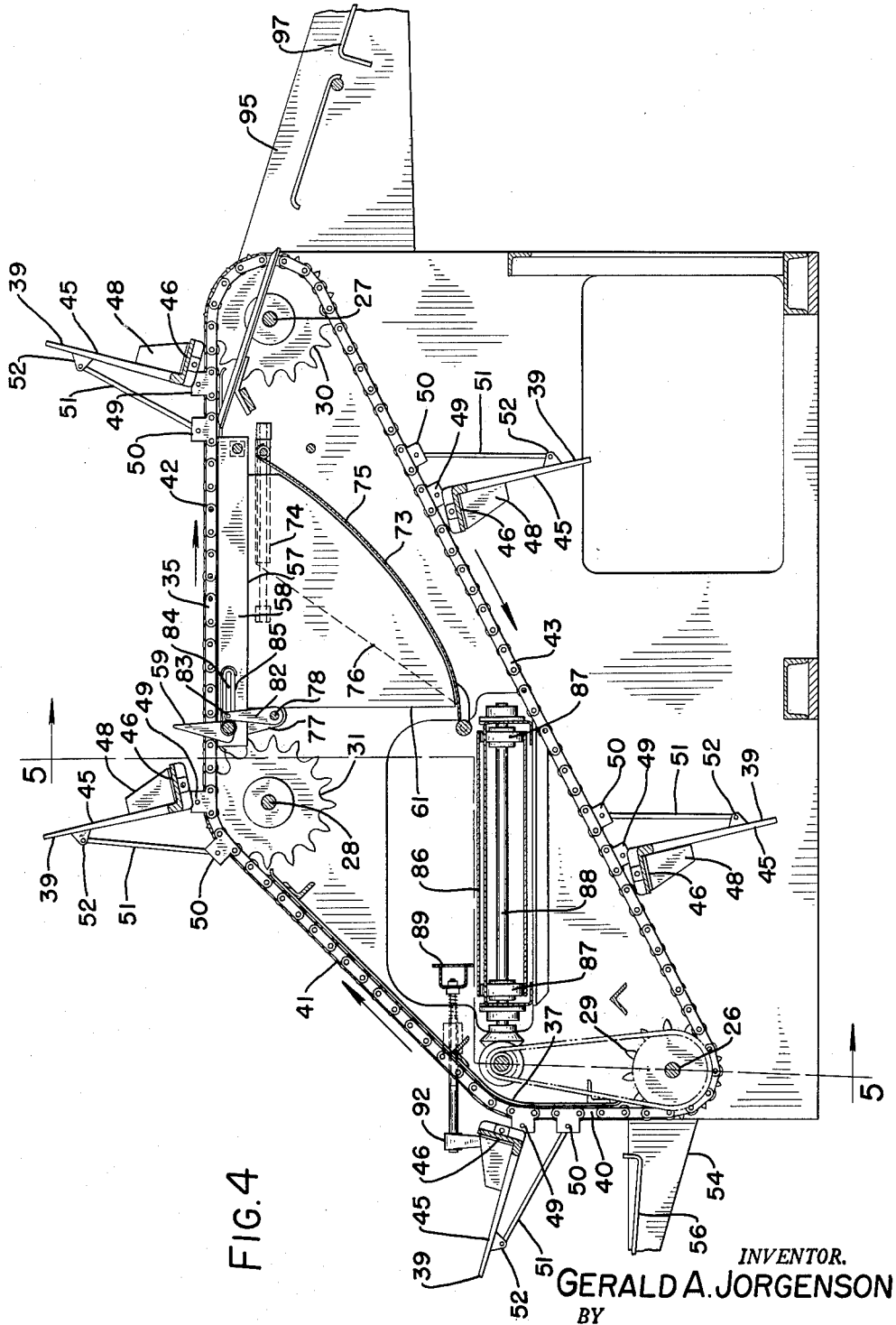
Figure 4 is a sectional view taken on the line 4—4 of Figure 3.

Journaled in opposite sides of the framework 24 are transversely extending shafts 26, 27 and 28, shaft 26 being disposed adjacent the lower forward or infeed end of the depanner, shaft 27 adjacent the upper rearward or pan discharge end, and shaft 28 adjacent the upper end of the depanner between the shafts 26 and 27, as best shown in Figure 4. On one end of each of the shafts 26, 27 and 28 adjacent one side of the framework 24 are secured the respective sprockets 29, 30 and 31. Similarly, on the opposite end of each of the shafts 26, 27 and 28 adjacent the side of the framework 24 are secured the respective sprockets 32, 33 and 34, Figure 2.

Trained around the sprockets 29, 30, 31 is a sprocket chain 35 and around the sprockets 32, 33, 34, a sprocket chain 36, preferably of conventional bar link roller type. Adjacent the infeed end of the depanner above the sprockets 29 and 32, the chains 35 and 36 are guided about respective curved tracks 37 and 38, to provide the pan carriers 39, which are supported at spaced intervals between and by the chains 35 and 36, with a vertical run 40 and a diagonally upward and forward run 41, as best shown in Figure 4. Between the sprockets 31, 34 and 30, 33, the chains 35 and 36 provide the carriers 39 with a substantially horizontal run 42 or if desired a slightly downwardly sloping run. Between the sprockets 30, 33 and 29, 32, the chains 35 and 36 provide the carriers 39 with a rearwardly and downwardly sloping return run 43.

The pan carriers 39 are substantially L shaped in cross section, the upright portion of the L being in the form of a grid 44 comprising spaced fingers 45, and the base portion of the L being in the form of a ledge 46 having at its ends outwardly diverging pan guide stops 47. Mounted on the ledge 46 are laterally adjustable outwardly diverging pan guides 48 for properly locating the pans at the bread dumping station on the horizontal run 42 immediately forward of the sprockets 31, 34. The ledge 46 and grid 44 of the pan carriers 39 support the straps of pans 22 from the loading station adjacent the vertical run 40 to the dumping station, the arrows in Figure 4 indicating the direction of travel of the chains 35, 36 and the pan carriers 39 supported thereon.

The pan carriers 39 are supported in such a manner, as hereinafter described, that at the dumping station which, as previously explained, is along the horizontal run 42 immediately forward of the sprockets 31, 34, the outwardly projecting grid member 44 of the pan carrier 39 tilts forward, assuming the same tilted position as the pan carrier 39 at the right in Figure 4, so that the pan set becomes overbalanced and is turned upside down.

In order to support the pan carriers 39, they are pivotally connected at their opposite ends, at the corners where their grid 44 and ledge member 46 join, to brackets 49 formed with or attached to links of the chains 35 and 36. Rearward of the brackets 49 are similar brackets 50 to which are pivotally connected one end of rods 51, the other end of which rods have a pivotal connection 52 with the outer end portions of the pan carriers 39. These pivotal connections provide the necessary flexibility to permit the pan carriers and supports to travel around the several sprockets.

Rigidly attached to opposite sides and extending rearwardly from the depanner adjacent its loading end are brackets 53 and 54. A cross bar 55 connects the outer ends of the brackets 53 and 54, from which may be supported the discharge end of the conveyor 21. Secured to the cross bar 55 and extending forwardly therefrom are a plurality of transversely spaced stationary fingers 56 forming a support for the pan sets delivered from the conveyor 21.

As each of the pan carriers 39 travels up along the vertical run 40, the fingers 45 of its grid member 44 pass between the stationary fingers 56 and pick up a strap of bread filled pans 22 and conveys it to the dumping station where, as previously explained, the pans are overturned.

At the dumping station along and below the horizontal run 42 is a rectangular frame indicated as a whole by the reference character 57, Figure 2, which is supported between the sides of the framework 24 in a manner to be easily removable. Supported by and consequently removable as a unit with the frame 57 are the knock out bars 58, the pan stabilizers 59, the bread turn-over plates 60 and the bread chute partitions 61.

Figure 7:
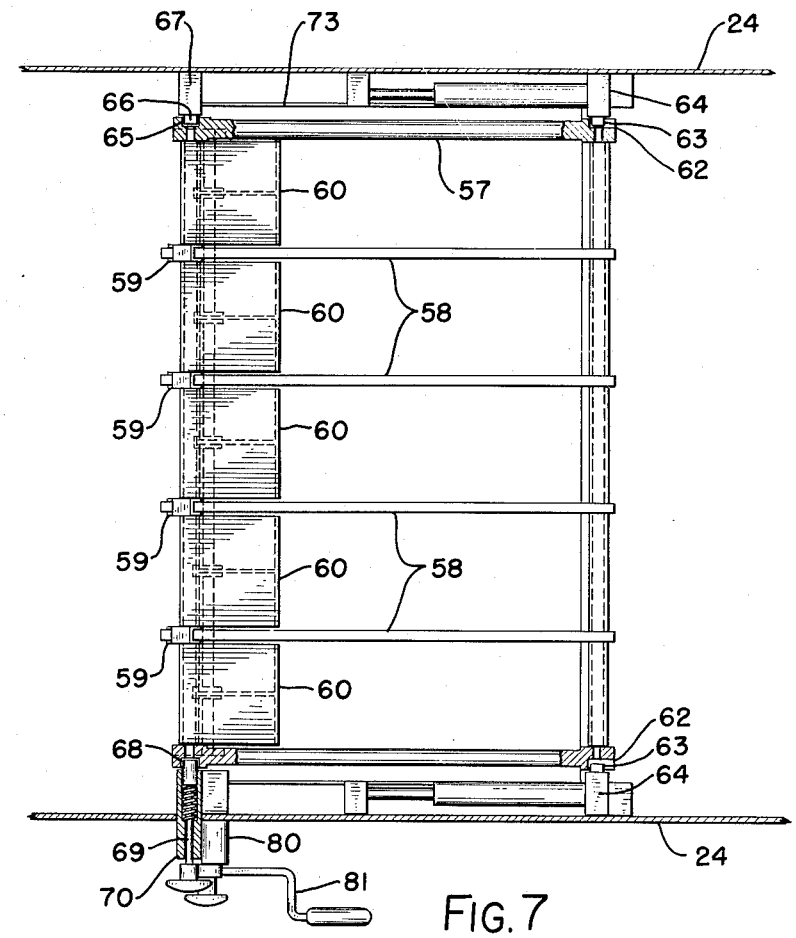
Figure 7 is a fragmentary plan view of the depanner at the bread dumping station, with parts broken away and shown in section.

The forward corners of the frame 57 are provided with forwardly opening U-shaped recesses 62 arranged to engage pins 63 extending inwardly of brackets 64, which brackets are secured to opposite sides of the framework 24, whereby the frame 57 is pivotally supported and removable by withdrawing it rearwardly out of engagement with the pins 63, all as best shown in Figure 7.

One of the rearward corners of the frame 57 is provided with a downwardly opening U-shaped recess 65 arranged to engage a pin 66 extending inwardly of bracket 67, which bracket is secured to the side of the framework 24, preventing downward, forward and rearward displacement of the frame 57 but permitting upward movement pivotally about its forward end, all as best shown in Figure 7. The other rearward corner of the frame 57 is provided with a laterally outwardly opening cavity 68 arranged to receive spring pressed pin 69 supported in the bracket 70, which bracket is secured to the side of the framework 24, whereby the frame 57 may be locked in place, all as best shown in Figure 7.

Thus to remove the frame 57 together with the various elements carried thereby, it is only necessary to pull pin 69 out of engagement with cavity 68, raise the frame 57 pivotally about its forward end until the recess 65 is disengaged from pin 66, pull the frame 57 rearward until the recesses 62 are disengaged from pins 63, and then raise the frame 57 out of the framework 24.

The longitudinally extending transversely spaced knock out bars 58 are secured in any suitable manner at their opposite ends to the cross pieces of the frame 57. The knock out bars 58 are so spaced as to be in alinement with the spaces between adjacent pans of the pan sets 22 so that when the pan sets overturn and the straps that hold the pans of a pan set together land on the knock out bars 58, the loaves of bread, which are jarred loose by the impact, will drop between the knock out bars.

Movably mounted on the rearward crosspiece of the frame 57 directly above the rearward ends of the knock out bars 58 and normally held in an upright position by suitable light spring means (not shown), are the pan stabilizing fingers 59. It is evident then, that when a pan set 22 is overturned at the dumping station, the fingers 59 will engage in the spaces between the pans of the pan set 22, and by reason of engagement of the fingers 59 with the rearward portion of the pan strap and the sides of adjacent pans, forward and lateral movement of the pan set after being overturned is restrained, thereby stabilizing or holding the pans in proper position for discharge of the loaves of bread from the pans. The stabilizing fingers 59 are released from engagement with the pan sets 22 by being forced pivotally downward against the tension of spring means (not shown) as the pan sets are pushed forward in their inverted position by the pan carriers 39.

The loaves of bread falling from the pan sets at the dumping station are received by a chute 73 which is supported in any suitable manner from the sides of the framework 24, as shown at 74 in Figure 4. The chute 73 comprises a plate 75 curving downwardly and rearwardly, from a position immediately beneath the forward end of the dumping station to a position considerably beneath the rearward end of the dumping station. The sides of the chute 73 are provided with side walls 76 which together with the partitions 61 form individual passages for the loaves falling from the pans of a pan set 22.

Pivotally mounted on the rearward cross piece of the frame 57 and extending a distance forward of the said cross piece are the bread turn-over plates 60. These plates coincide with the passages in the chute 73 formed by the partitions 61 and the chute side walls 76. Now, when a pan set 22 is inverted at the dumping station, the plates 60 provide a support for the rearward end of the loaves of bread while the forward ends of the loaves are free to fall, whereby the loaves will be turned right side up and slide down the curved walls 75 of the chute 73.

Adjusting means is provided for varying the slope of the plates 60 to effect most efficient turn-over for different sized loaves. This may be readily determined by trial and error and the proper setting for different sized loaves arrived at. The adjusting means, Figures 4, 5 and 7, includes brackets 77 depending from the rearward end of the frame 57 adjacent each side of the framework 24. Mounted for rotation in the lower ends of the brackets 77 is a transversely extending rod 78, one end of which is angularly formed and engages the bifurcated end of a shaft 79 mounted in a bearing 80 carried by the framework 24. The end of the shaft 79 opposite its bifurcated end, projects outwardly and carries a handle 81 through which the rod 78 may be turned. Rigidly secured at one end on the rod 78 are a number of lever arms 82. The free ends of the lever arms 82 are provided with pins 83 engaging in longitudinal slots 84 formed in members 85 which are rigidly secured to the under sides of the plates 60. Thus by turning the rod 78, the lever arms 82 through their pin and slot connection will effect the adjustment of the plates 60. Any suitable means may be used for retaining the handle 81 in adjusted position.

Extending transversely through the depanner 20 is an endless bread conveyor 86 the top run of which is disposed rearward of and slightly below the level of the bottom of the bread chute 73 in position to receive the loaves of bread from the chute. The conveyor 86, as shown in Figure 4, is trained at one end over sprockets 87 secured on a shaft 88 which is supported in suitable manner by the framework 24.

A stop plate 89 extends along one side of the conveyor 86 opposite the bread chute 73 to properly position the loaves on the conveyor 86. The stop plate 89 is loosely mounted on the ends of a pair of shafts 90 threaded in brackets 91 which are secured to opposite sides of the framework 24. Handles 92 are provided on the ends of the shafts 90 opposite the stop plate 89, for threading the shafts 90 in and out of the brackets 91 to adjust the position of the stop plate 89. Spring means 93 provide for yielding movement of the stop plate 89 to absorb the shock of the loaves and to minimize the tendency of the loaves to bounce from the stop plate 89.

A pair of pan turn-over support plates 94 and 95 are securely attached in suitable manner to the upper rearward ends of the respective side walls of the depanner framework 24 and extend rearwardly therefrom. Rotatably mounted in the rearward ends of the support plates 94 and 95 below the level of the horizontal run 42 of the pan carriers 39 is a transverse shaft 96 which carries a grid-like pan turn-over member 97. The pan turn-over member 97 includes a hub 98 from which project a plurality of diametrically oppositely projecting fingers 99. The ends of the fingers are bent at right angles to form a stop for retaining the pans on the pan turn-over member 97 when the latter is in position for receiving the empty pans from the depanner, all as best shown in Figures 1 and 2. A grid-like member 100 is supported between and by the support plates 94 and 95 and slopes downwardly and rearwardly from the pan discharge end of the horizontal run 42 of the pan carriers 39 to the pan turn-over member 97, to provide a guide support for directing the discharged pans onto the pan turn-over member 97. Rotation of the pan turn-over member 97, rights the pans from their inverted position and drops them onto the conveyor 23.

The drive mechanism for the depanner 20 includes a motor 101 and gear reducer 102 mounted in the lower rearward end of the framework 24, as shown in Figure 1. While the drive from motor 101 may be connected with any one of the shafts 26, 27, 28, Figure 4, it is shown and will be described as connected with shaft 27.

Figure 2:
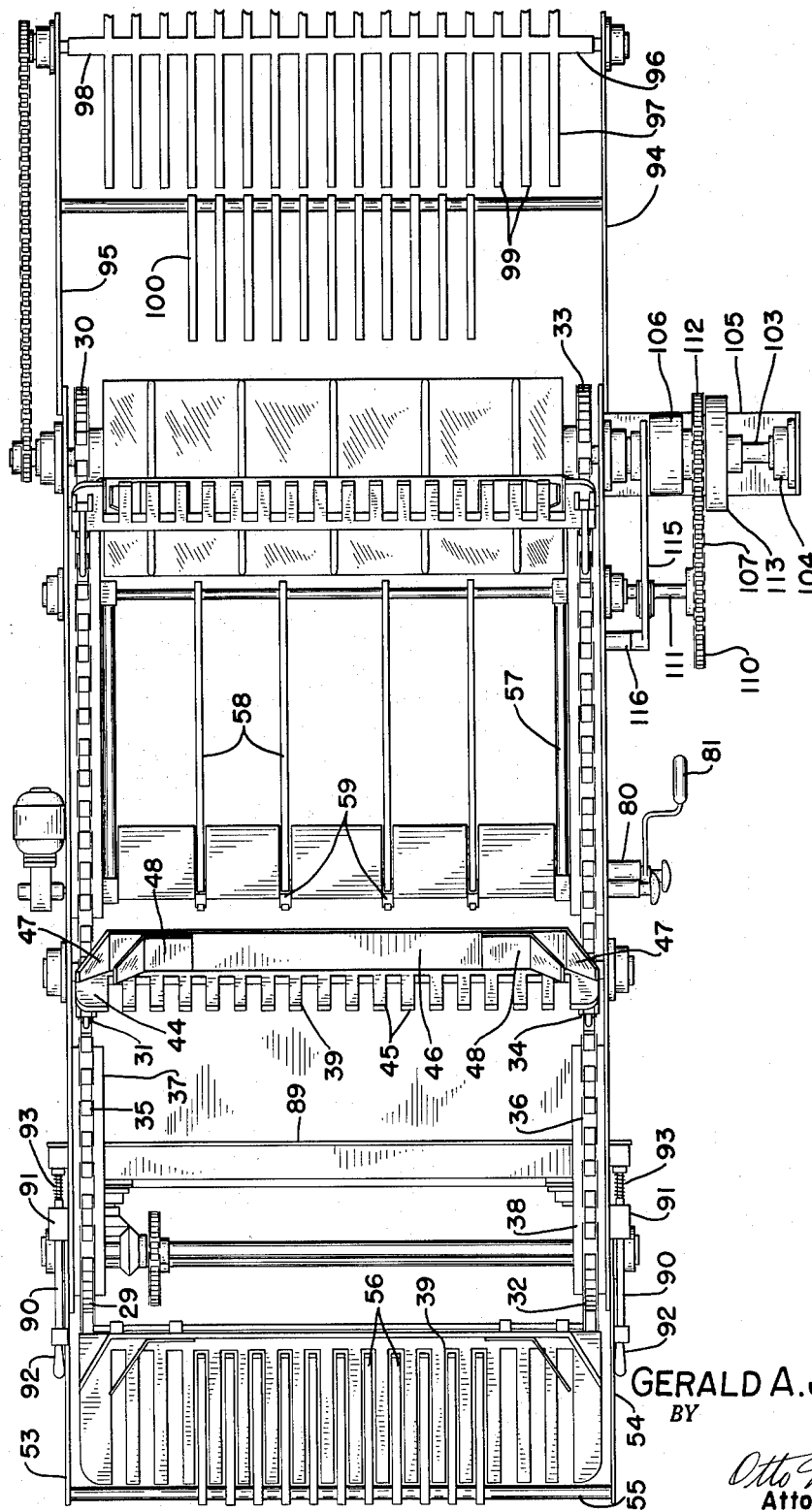
Figure 2 is an enlarged plan view of the depanner.

The shaft 27 is provided with a laterally projecting extension 103, mounted at its end in a bearing 104 which is supported by a bracket 105 rigidly secured, in suitable manner, on one side of the depanner framework 24, as best shown in Figures 2 and 3.

Associated with the drive for the shaft 27, is a suitable one revolution clutch 106, as for example, a "Hilliard Single Revolution Clutch, Type 6," that will cause each of the pan carriers 39 to halt momentarily when they reach the pan dumping station, as indicated at point marked A in Figure 1. This momentary halt is of sufficient duration, preferably about four seconds, to permit the pans carried by the pan carriers 39 to fall over and for the loaves of bread to be ejected from the pans before the empty overturned pans are moved forwardly along the horizontal run 42 by the pan carriers 39.

For driving the continuously rotating element of the one revolution clutch 106 a sprocket chain 107, Figure 1, is entrained over a sprocket 108 on drive shaft 109, sprocket 110 on idler shaft 111, and sprocket 112 of friction clutch 113 on the shaft extension 103. The friction clutch 113 is provided as a safety measure should the pan conveyor become jammed for any reason.

In order to momentarily stop the shaft 27 and its extension 103 and thereby, as set forth above, halt each of the pan conveyors when they reach the position A, the intermittently driven member of the one revolution clutch 106 is provided with a cam step 114 arranged to be engaged by a trip lever 115 which has a pivotal mounting 116. The trip lever 115 is disengaged from the cam step 114 to permit a single revolution of the shaft 27 and its extension 103, by means of an arm 117, mounted to rotate with the shaft 111, that contacts the trip lever 115 to pivotally raise it out of engagement with the cam step 114.

To provide for the dwell of the pan carriers 39 at the position A for the purpose previously explained, the sprocket 110 is greater in diameter than sprocket 112, whereby shaft 111 will rotate slower than shaft 27 and its extension 103. Thus the trip lever 115 will remain in engagement with the cam step 114 for a period of time before the arm 117 contacts the trip lever 115 to effect disengagement of the latter from the cam step 114.

The drive for the bread conveyor 86, as best shown in Figure 5, includes a sprocket 118 on the shaft 26, a sprocket 119 on a shaft 120 and a sprocket chain 121 trained over the sprockets 118 and 119. The shaft 120 which extends transversely of and is journaled in the framework 24, is disposed in the same horizontal plane as the shaft 88 of the bread conveyor 86 and above the shaft 26. Rotation of shaft 120 from shaft 26 is transmitted to the shaft 88 by means of bevel gears 122 and 123 mounted, respectively, on the adjacent ends of the shafts 88 and 120.

Rotation of the pan turn-over member 97 is transmitted from shaft 27 through a sprocket chain 124 trained over sprockets 125 and 126 mounted on projecting ends of the shafts 27 and 96, respectively.

Figure 9:
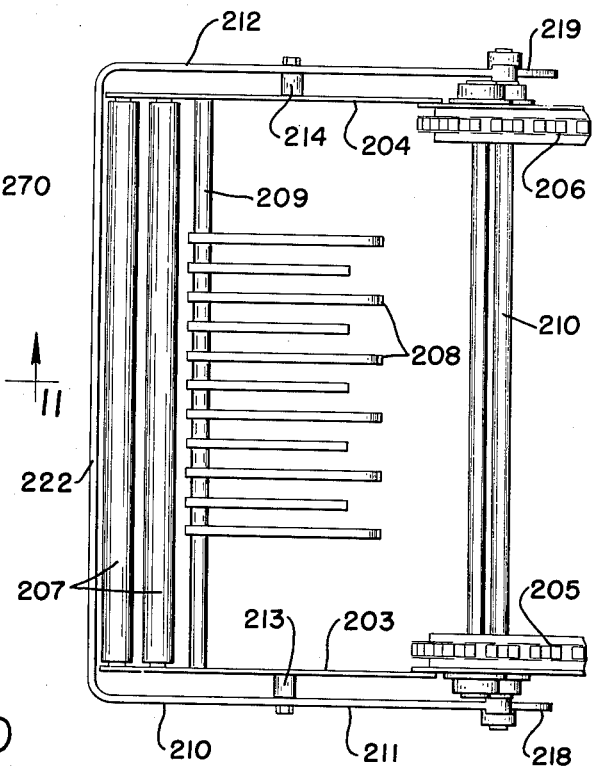
Figure 9 is a plan view of the mechanism shown in Figure 8.

Referring now to Figures 8 and 9, there is shown a modification of the infeed or loading end of the depanner whereby one pan set may be picked up from the pan support on the infeed end of the depanner without interference from the next succeeding pan set.

As in the previously described form of the invention, a conveyor 200 delivers straps of pans 201 of baked bread from an oven (not shown) to the depanner 202. The means for receiving the pan sets from the conveyor 200 and for supporting them until picked up by the pan carriers 239, includes brackets 203 and 204 rigidly attached to opposite sides and extending rearwardly from the depanner adjacent its loading end. One pan carrier 239 is shown in Figure 8, but a plurality of such pan carriers are provided which are in all respects the same as the pan carriers 39 previously described, and are carried by the sprocket chains 205 and 206.

Mounted in the rearward ends of the brackets 203 and 204 are a pair of transversely extending spaced rollers 207, with the rearward roller disposed in a plane slightly lower than the forward roller, whereby the pan sets can roll freely forward from the delivery end of the conveyor 200. Upon leaving the rollers 207, the pan sets are supported, in position to be picked up by the pan carriers 239, on a plurality of transversely spaced stationary fingers 208 which are secured to and extend forwardly from a cross bar 209 supported at its opposite ends in the brackets 203 and 204 just forward of the rollers 207.

In order to hold back succeeding pan sets 201 on the conveyor 200 until a preceding pan set has been picked up from the supporting fingers 208 by a pan carrier, a three sided frame 210 is provided that extends about the sides and rearward ends of the brackets 203 and 204. The side members 211 and 212 of the frame 210 are pivotally supported intermediate their ends on the laterally projecting pins 213 and 214 carried by the brackets 203 and 204.

The forward ends of the side members 211 and 212 of the frame 210 are provided with cam followers, the cam follower for side member 211 being shown in Figure 8 at 215. A spring 216 attached at one end to the side member 211 of frame 210 forward of its pivotal mounting and attached at its other end to the framework 217, and a similar spring arrangement (not shown) for the side member 212, retain the cam followers in engagement with cams 218 and 219. The cams 218 and 219 are mounted on the opposite ends of the shaft 220 which is operatively connected with the pan carrier sprocket chains 205 and 206.

When the cam followers 215 ride along the high portion 221 of the cams 218 and 219, the frame 210 will assume the position shown in full lines in Figure 8, whereby a pan set 201 is free to pass over the cross member 222 of the frame 210 from the conveyor 200 onto the pan supporting fingers 208. Now, when the cam followers 215 leave the high portion 221 of the cams 218 and 219, the springs 216 will urge the rearward end of frame 210 upwardly about its pivots, and the cross member 222 will engage the front end of the next succeeding pan set and prevent it from advancing, as shown by the dot and dash lines in Figure 8.

The operation of the frame 210 is timed with the operation of the pan carriers 239 so that only one pan at a time is permitted to advance from the conveyor 200 each time a pan carrier 239 is in position to pick up a pan set. Since the cam 218 that oscillates the frame 210 is fixed on the same shaft 220 that is rotated by engagement of a pair of sprockets with the pan carrier sprocket chains 205 and 206, this may be accomplished by making the pitch circumference of the sprockets equal to the distance between successive pan carriers 239. The sprockets are not shown on Figures 8 and 9, but it is understood that they are the counterpart of the sprockets 29 and 32, previously described.

Referring to Figure 8, the pan carrier 239 has just picked up a pan set and the frame 222, as shown in dot and dash lines, is in position to stop the next pan set. Before the next pan carrier 239 is in position to pick up a pan set, the high part 221 of cam 218 is in position to move the frame to the position shown in full lines, whereupon the next pan set advances from the conveyor 200 into position to be picked up.

Figure 12:
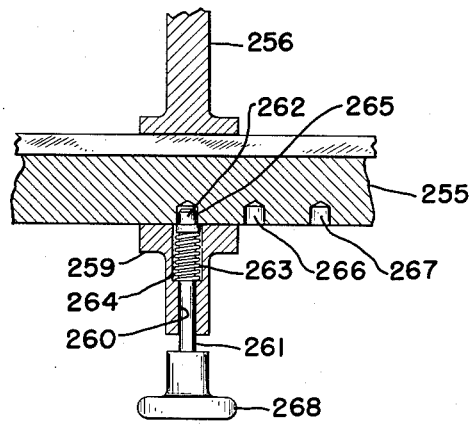
Figure 12 is an enlarged sectional view taken on the line 12—12 of Figure 11.
Figure 10:
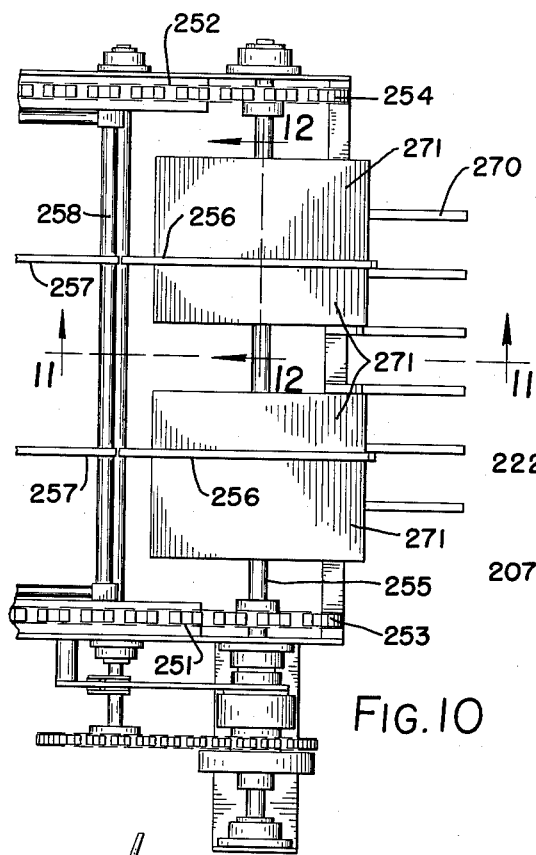
Figure 10 is a plan view at the discharge end of the depanner, showing a modification of the pan turn-over mechanism.
Figure 11:
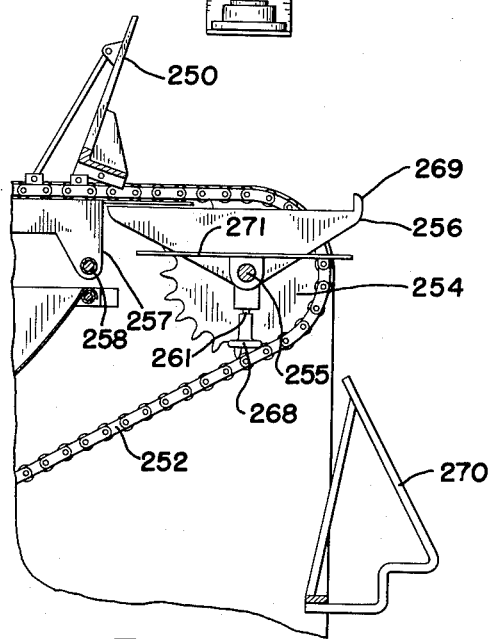
Figure 11 is a sectional view taken on the line 11—11 of Figure 10.

In Figures 10, 11 and 12 is shown a modified form of the empty pan re-righting mechanism of the depanner. As in the form of the invention first described the pan sets that have been inverted and from which the bread has been removed, are pushed forwardly by the pan carriers 250. The pan carriers 250 are attached to the endless conveyor chains 251 and 252 which are entrained over sprockets 253 and 254 mounted on the shaft 255. The shaft 255 is driven in the same manner as shaft 27 of the previously described form of the invention.

Mounted for rotation with the shaft 255, in the manner hereinafter described, are a pair of transversely spaced upright longitudinally extending guide support plates 256. The plates 256 are disposed on the shaft 255 in alinement with the knockout bars 257 which are carried by the frame 258. The frame 258, as described in connection with the first form of the invention, is removably supported on the depanner framework. In Figure 10, the knock-out bars 257 and guide support plates 256 are arranged to receive "three pan straps," in other words, a pan set of three pans strapped together. Should "five pan straps" be run through the depanner, the frame 258 can be conveniently removed, as previously explained, and a frame such as frame 57 of Figure 2 can be installed. It is now only necessary to adjust the position of the guide support plates 256 on the shaft 255 for alinement with, for example, the outer pair of knock-out bars of the substituted frame. Similar adjustment of the guide support plates 256 can be made for "four pan straps."

In Figure 12 is shown a suitable arrangement for adjustably securing the guide support plates 256 on the shaft 255. The guide support plate 256 is provided with a hub 259 loosely mounted on the shaft 255. A bore 260 extends through the hub 259 diametrically opposite the plate 256, and a stem 261 extends through the bore 260. The inner end of the stem 261 carries a button 262, and a spring 263 in an enlargement 264 of the bore 260 urges the button 262 in engagement with a recess 265 in the shaft 255. Similar recesses 266 and 267 are provided for adjusting the position of the plates 256 for "four pan straps" or "five pan straps." By pulling on the knob 268 carried by the outer end of the stem 261, the button 262 is disengaged from the recess 265 and the plate 256 can be moved along shaft 255, until the button 262 engages one of the recesses 266 and 267.

When a pan set is pushed onto the guide support plates 256 by a pan carrier 250, rotation of the plates 256 gradually inverts the pan set. The pan set is prevented from sliding off the plates 256 by engagement of its forward end with the lips 269 of the plates 256. Upon continued rotation of the plates 256, the pan set becomes overbalanced and drops by gravity from the plates 256 and the overturned pan set slides along a sloping support grid 270 and is deposited onto a suitable conveyor (not shown) in righted position, ready to be carried away.

Extending laterally from each side of the plates 256 and rotatable therewith are trays 271. These trays are so disposed as to be inward of the pan supporting edges of the plates 256, as best shown in Figure 11. Thus, should a loaf of bread be partly dislodged from a pan but fail to drop out at the dumping station, the trays 271 will, as they rotate with the plates 256, prevent the loaf from dropping out of the pan after the latter leaves the dumping station and eliminate the possibility of the loaf striking the shaft 255 and jamming the machine or the pans.

I claim:

1. A depanning device for removing baked products from pans, including a pan carrier movable along an upwardly extending run and then from its upper extremity along a forwardly extending run, said pan carrier having a surface disposed to support a filled pan along said upwardly extending run and being sloped forwardly from the normal to the run of said carrier in the direction of travel thereof to tilt said pan to an overbalancing position on said forwardly extending run, means for arresting fall of said pan in its inverted position to dislodge baked products therefrom, and means for momentarily interrupting movement of said pan carrier upon reaching said forwardly extending run.

2. In an apparatus for removing baked products from a pan set of laterally spaced pans rigidly connected by straps, the combination of a pan set carrier movable along an upwardly extending and then along a forwardly extending run, said carrier having a surface disposed to support a filled pan set along said upwardly extending run and to tilt said pan set to an overbalancing position on said forwardly extending run, means for arresting fall of said pan set in its inverted position to dislodge baked products therefrom, and laterally spaced upright fingers on said forwardly extending run adapted to project through the spaces between adjacent pans of a pan set and engage the pan straps for arresting forward momentum of said pan set.

3. In an apparatus for removing baked products from a pan set of laterally spaced pans rigidly connected by straps, the combination of a pan set carrier movable along an upwardly extending and then along a forwardly extending run, said carrier having a surface disposed to support a filled pan set along said upwardly extending run and to tilt said pan set to an overbalancing position on said forwardly extending run, means for arresting fall of said pan set in its inverted position to dislodge baked products therefrom, and laterally spaced fingers pivotally mounted on said forwardly extending run, means biasing said fingers in an upright position to project through the spaces between adjacent pans of a pan set and engage the pan straps for arresting forward momentum of said pan set, said fingers being movable out of engaging position against the force of said biasing means upon advancement of said pan set by said pan carrier along said forwardly extending run.

4. In a depanning device for removing baked products from pans, endless conveying means including an upwardly extending and a forwardly extending run, pan carriers attached to said endless conveying means, said pan carriers being inclined forward from the normal to said conveying means at their point of attachment, whereby pans carried by said pan carriers become overbalanced when said pan carriers pass from said upwardly extending run onto said forwardly extending run and pivotally fall by gravity in an inverted position, means for arresting fall of said pans in their inverted position to dislodge baked products therefrom, means for operating said conveying means, and means for momentarily interrupting operation of said conveying means when said pan carriers reach said forwardly extending run.

5. In an apparatus for removing bread loaves from a pan set of laterally spaced pans rigidly connected by straps, the combination of a framework, laterally spaced endless chains mounted therein including an upwardly extending and a forwardly extending run, pan set carriers extending between and attached to said laterally spaced endless chains, said carriers being arranged to support filled pan sets along said upwardly extending run and to tilt said pan sets to an overbalancing position on said forwardly extending run, a removable frame supported by said framework subjacent said forwardly extending run, longitudinally spaced bars secured to said frame spaced laterally apart to engage the straps between adjacent pans of a pan set for arresting said pan set in its inverted position to dislodge the bread therefrom, and upright fingers carried by said frame spaced laterally apart to project through the spaces between adjacent pans of a pan set and adapted to engage the pan straps for arresting forward momentum of said pan set.

6. In an apparatus for removing bread loaves from a pan set of laterally spaced pans rigidly connected by straps, the combination of a framework, laterally spaced endless chains mounted therein including an upwardly extending and a forwardly extending run, pan set carriers extending between and attached to said laterally spaced endless chains, said carriers being arranged to support filled pan sets along said upwardly extending run and to tilt said pan sets to an overbalancing position on said forwardly extending run, a removable frame supported by said framework subjacent said forwardly extending run, longitudinally spaced bars secured to said frame spaced laterally apart to engage the straps between adjacent pans of a pan set for arresting said pan set in its inverted position to dislodge the bread therefrom, and upright fingers carried by said frame spaced laterally apart to project through the spaces between adjacent pans of a pan set and adapted to engage the pan straps for arresting forward momentum of said pan set, and means carried by said frame to engage end portions of the loaves of bread dislodged from said pans to re-invert the loaves as they fall from the pans.

7. In a depanning device for removing baked products from pans, endless conveying means including an upwardly extending and a forwardly extending run, pan carriers attached to said endless conveying means, said pan carriers being inclined forward from the normal to said conveying means at their point of attachment, whereby pans carried by said pan carriers become overbalanced when said pan carriers pass from said upwardly extending run onto said forwardly extending run and pivotally fall by gravity in an inverted position, means for arresting fall of said pans in their inverted position to dislodge baked products therefrom, means for operating said conveying means including a single revolution clutch for interrupting operation of said conveying means when said pan carriers reach said forwardly extending run, and means for re-engaging said clutch after a predetermined interval.

References Cited in the file of this patent

UNITED STATES PATENTS

| | | |
|---|---|---|
| 665,022 | Levalley | Jan. 1, 1901 |
| 1,430,160 | Eggert | Sept. 26, 1922 |
| 1,473,996 | McGarry | Nov. 3, 1923 |
| 1,926,318 | Thompson et al. | Sept. 12, 1933 |
| 2,141,883 | Simmons | Dec. 27, 1938 |
| 2,462,021 | Harker | Feb. 15, 1949 |
| 2,524,656 | Eyster | Oct. 3, 1950 |
| 2,561,775 | Bausman | July 24, 1951 |
| 2,609,944 | Nicoletti | Sept. 9, 1952 |